United States Patent
Karuppiah et al.

(10) Patent No.: US 9,742,870 B2
(45) Date of Patent: Aug. 22, 2017

(54) SELECTIVE DOWNLOAD OF ALTERNATE MEDIA FILES

(71) Applicant: ARRIS Enterprises, Inc., Suwanee, GA (US)

(72) Inventors: Sadeesh Kumar Karuppiah, Bangalore (IN); Anil Nainwal, Bangalore (IN); Balamurugan Souppourayen, Bangalore (IN); Praveen Girish, Bangalore (IN); Manikandan Vaitheswaran, Bangalore (IN); Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 147 days.

(21) Appl. No.: 14/744,264

(22) Filed: Jun. 19, 2015

(65) Prior Publication Data
US 2016/0373551 A1    Dec. 22, 2016

(51) Int. Cl.
*H04L 29/08* (2006.01)
*G06F 17/30* (2006.01)
*H04L 12/24* (2006.01)

(52) U.S. Cl.
CPC ...... *H04L 67/327* (2013.01); *G06F 17/30029* (2013.01); *H04L 41/0896* (2013.01); *H04L 67/02* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 5,410,344 A | 4/1995 | Graves et al. | |
| 8,086,168 B2 | 12/2011 | Moran et al. | |
| 2012/0047542 A1* | 2/2012 | Lewis | H04N 21/44016 725/97 |
| 2012/0311075 A1* | 12/2012 | Pantos | H04N 21/4825 709/217 |

(Continued)

FOREIGN PATENT DOCUMENTS

WO     2012/166816 A1    12/2012

OTHER PUBLICATIONS

PCT Search Report & Written Opinion, Re: Application No. PCT/US2016/032960, dated Jul. 25, 2016.

*Primary Examiner* — Thomas Dailey
(74) *Attorney, Agent, or Firm* — Bart A. Perkins

(57) ABSTRACT

Methods, systems, and computer readable media can be operable to facilitate delivery of multiple media renditions of multimedia content to a subscriber. The methods, systems, and apparatuses described herein enable the identification and retrieval of one or more preferred or requested media renditions of multimedia content. A subscriber device can maintain a list of media attributes preferred by the subscriber device and/or one or more users with access to the subscriber device, wherein the list includes preferred media attributes in order from the most requested/received attribute to the least requested/received attribute. When the subscriber device receives a request for multimedia content, the subscriber device can identify one or more media attributes preferred by the subscriber, and media renditions of the multimedia content having an identified preferred media attribute can be downloaded to the subscriber device.

17 Claims, 4 Drawing Sheets

(56) References Cited

U.S. PATENT DOCUMENTS

| | | | |
|---|---|---|---|
| 2013/0291002 A1* | 10/2013 | Rothschild | H04N 21/258 725/25 |
| 2014/0052823 A1 | 2/2014 | Gavade et al. | |
| 2014/0150019 A1* | 5/2014 | Ma | G06Q 30/0251 725/34 |
| 2014/0280781 A1 | 9/2014 | Gregotski | |
| 2015/0120821 A1* | 4/2015 | Bendell | H04L 67/2842 709/203 |
| 2016/0127440 A1* | 5/2016 | Gordon | H04N 21/23439 709/219 |
| 2016/0212496 A1* | 7/2016 | Lau | H04N 21/6125 |

* cited by examiner

SELECTIVE DOWNLOAD OF ALTERNATE MEDIA FILES

TECHNICAL FIELD

This disclosure relates to selectively downloading alternate media files.

BACKGROUND

Adaptive bit rate streaming (ABS), such as Hypertext Transfer Protocol (HTTP) live streaming (HLS) and Moving Picture Experts Group dynamic adaptive streaming over HTTP (MPEG-DASH) has become a widespread form of multimedia consumption. ABS provides a subscriber device the ability to quickly switch between different streams of the same content, the streams having various quality levels, and therefore various bit rates. A content server creates variant bit rate streams for a single piece of multimedia content, and a feature at a subscriber device switches between the various streams according to available network bandwidth.

A content server may include a plurality of index or manifest files associated with a piece of multimedia content. Each index file includes a plurality of playlist files, each playlist file being associated with a different level of quality and bit rate. Each playlist file includes portions of the associated multimedia content, the portions being segmented according to a certain period of time. By segmenting the multimedia content into individual portions at different quality levels and bit rates, a subscriber device can select individual segments of the content from different playlists (e.g., segments of the content at different quality levels and bit rates). The subscriber device can periodically monitor the amount of bandwidth available to it, and change the playlist from which it is downloading the content accordingly. For example, as more bandwidth becomes available to the subscriber device, the subscriber device can start downloading content segments from a playlist of higher quality and bit rate. As less bandwidth is made available to the subscriber device, the subscriber device can start downloading content segments from a playlist of lower quality and/or bit rate.

In addition to different quality levels and bit rates, multimedia content can be made available with different media renditions. For example, playlists comprising different audio renditions of a single piece of multimedia content can be located in a manifest or index file at a content server, wherein each audio rendition is associated with a different language (e.g., English, Spanish, French, etc.). As another example, a manifest or index file may include playlists comprising different video renditions of the multimedia content (e.g., a piece of multimedia content available in different video angles, different languages for text displayed within the video, etc.). The specific language associated with a playlist, or other unique attribute of the media associated with a playlist, may be identified from a metadata tag of the playlist (e.g., EXT_X_MEDIA).

Typically, when a user requests multimedia content from the content server, only a single media rendition of the multimedia content is received by the subscriber device. When the user decides to switch to a different media rendition (e.g., different language) of the multimedia content, the subscriber device generally must first determine the location of the media rendition within the associated manifest or index file, then download the media rendition, and start playing the media rendition from the point in the content at which the user requested to switch renditions. This process can create a significant delay between the point in time at which the user decides to switch media renditions and when the subscriber device begins outputting the new media rendition. Therefore, a need exists for improving methods and systems for delivering alternate media files to a subscriber device.

BRIEF DESCRIPTION OF THE DRAWINGS

Like reference numbers and designations in the various drawings indicate like elements.

DETAILED DESCRIPTION

It is desirable to improve upon methods and systems for providing different media renditions of content to a subscriber. Methods, systems, and computer readable media can be operable to facilitate delivery of multiple media renditions of multimedia content to a subscriber. The methods, systems, and apparatuses described herein enable the identification and retrieval of one or more preferred or requested media renditions of multimedia content. A subscriber device can maintain a list of languages or other attributes preferred by the subscriber device and/or one or more users with access to the subscriber device, wherein the list includes preferred languages or other attributes in order from the most requested/received language or attribute to the least requested/received language or attribute. When the subscriber device receives a request for multimedia content, the subscriber device can identify one or more languages preferred by the subscriber, and media renditions of the multimedia content in each of the identified languages can be downloaded to the subscriber device. It should be understood, that methods, systems, and apparatuses described herein may be used to maintain a hierarchy of various media attributes (e.g., attributes identifiable by way of a playlist tag such as an EXT-X-MEDIA tag) based on device and/or subscriber preference.

In embodiments, a scoring algorithm can be used to maintain a score representative of the level of preference shown to particular attributes or languages by a subscriber device or individual user having access to the subscriber device. For example, each time a particular language is requested or received within multimedia content at the subscriber device, the score for that particular language can be incremented. Depending on the amount of bandwidth available to the subscriber device, the subscriber device can receive media rendition streams of the one or more highest scored languages or attributes. The one or more media renditions may be downloaded to the subscriber device in parallel such that when a user switches to a different media rendition (e.g., language) the transition between media renditions can be quick and efficient.

Figure 1:
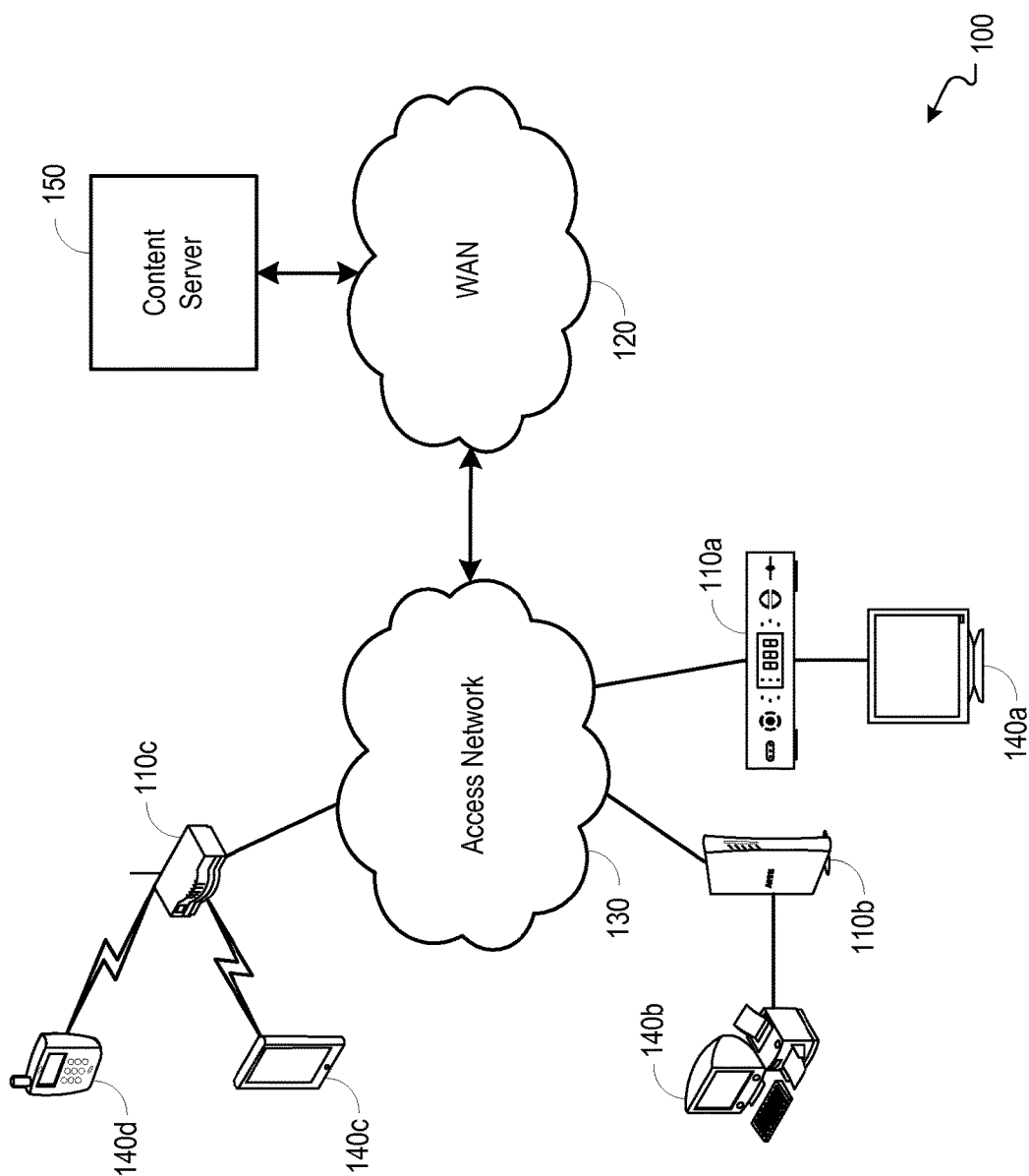
FIG. 1 is a block diagram illustrating an example network environment operable to facilitate the identification and delivery of one or more media renditions of content to a subscriber device.

FIG. 1 is a block diagram illustrating an example network environment 100 operable to facilitate the identification and delivery of one or more media renditions of content to a subscriber device. In embodiments, one or more customer premise equipment (CPE) devices (e.g., set-top box (STB) 110a, gateway 110b, wireless router including an embedded modem 110c, etc.) provide video, data and/or voice services to a subscriber by communicating with a wide area network (WAN) 120 through a connection to an access network 130 (e.g., a local area network (LAN), a wireless local area network (WLAN), a personal area network (PAN), high-speed wireless network, etc.). For example, a subscriber can receive and request video, data and/or voice services through a client device (e.g., television 140a, computer 140b, tablet 140c, mobile device 140d, etc.). The client device may receive the requested services through a connection to a CPE device or through a direct connection to the access network 130. While the components shown in FIG. 1 are shown separate from each other, it should be understood that the various components can be integrated into each other.

In embodiments, video services can be delivered to a client device using adaptive bit rate streaming (e.g., Hyper-text Transfer Protocol (HTTP) live streaming (HLS), Moving Picture Experts Group dynamic adaptive streaming over HTTP (MPEG-DASH), etc.). Using adaptive bit rate streaming, a single multimedia source file may be encoded and output as multiple streams at various bit rates. The bit rate may indicate the number of bits used per unit of playback time of the associated multimedia content. For example, the bit rate of a stream may be based upon the quality of the content rendition carried by the stream (e.g., higher quality rendition of content is streamed at a higher bit rate while lower quality rendition of content is streamed at a lower bitrate). Factors affecting the quality of content carried by a stream may include resolution, sampling frequency, encoding schemes, compression algorithms, and others.

Each of the multiple streams associated with a source file may be stored at a content server 150. The content server 150 may include a manifest file, the manifest file identifying a source file and each of the multiple streams/playlists and one or more properties of the multiple streams. For example, the manifest file may include quality parameters (e.g., resolution, encoding format, bandwidth, etc.) of each stream/playlist as well as the bit rate of each stream, such as the average bit rate of each stream. In embodiments, the various versions of the source content may be stored at the content server 150 as playlist files. For example, each version of the content (e.g., organized by quality parameters and/or bitrate) may be segmented into a plurality of individual files and may be organized in a playlist file associated with the quality parameters and/or bitrate of the version. Each segment may include a specific portion or period of playback time of the content. It should be understood that the content server 150 may exist within a subscriber premise at any of the one or more CPE devices 110a-c. For example one or more of the CPE devices 110a-c may host adaptive bit rate content on a server at the CPE devices 110a-c, and client devices 140a-d may retrieve the adaptive bit rate content from the servers at the CPE devices 110a-c.

In embodiments, using adaptive bit rate streaming, a CPE device 110a-c or client device 140a-d may receive multimedia content within a stream received at a bit rate that is amenable with the bandwidth available to the CPE device 110a-c or client device 140a-d. As more bandwidth becomes available to the CPE device or client device, the device may receive a stream carrying the content with better quality parameters at a higher bitrate, and as less bandwidth becomes available to the device, the device may receive the content with lesser quality parameters in a lower bitrate stream. The CPE device 110a-c or client device 140a-d may identify and retrieve multimedia content in streams of various bitrates from a manifest file located at the content server 150. For example, the device may periodically determine the amount of bandwidth available to the device and identify the playlist file (e.g., from the manifest file at the content server 150) that includes the multimedia content at a bit rate that can be received using the available bandwidth. The device may locate and download the next content segment from the identified playlist file such that the transition between playlists appears seamless to the subscriber.

In embodiments, a source video file may be associated with multiple audio files comprising audio associated with the video, wherein the audio files include various renditions of the corresponding audio. For example, each of the multiple audio files can include a rendition of the audio in a different language (e.g., English, Spanish, French, etc.). It should be understood that video playlists may also be identified based on a language associated with the underlying video (e.g., language of text within the content). Different multimedia playlist files including different audio or video renditions of the content may be stored at the content server 150. A language associated with a specific playlist may be identified based upon a tag associated with the playlist (e.g., EXT_X_MEDIA tag). A CPE device 110a-c or client device 140a-d may identify and retrieve one or more playlist files comprising media renditions in one or more desired languages. For example, a subscriber may request content in one or more specific languages, or the CPE device 110a-c or client device 140a-d may learn the one or more languages that are preferred by a subscriber. When a subscriber requests multimedia content, the CPE device 110a-c or client device 140a-d can identify and retrieve the playlist file that includes media in the language requested or preferred by a subscriber. In embodiments, a CPE device 110a-c or client device 140a-d can maintain a list of one or more languages ordered according to subscriber preferences, and may download media files in one or more of the languages preferred by the subscriber according to the amount of bandwidth available to the device.

Figure 2:
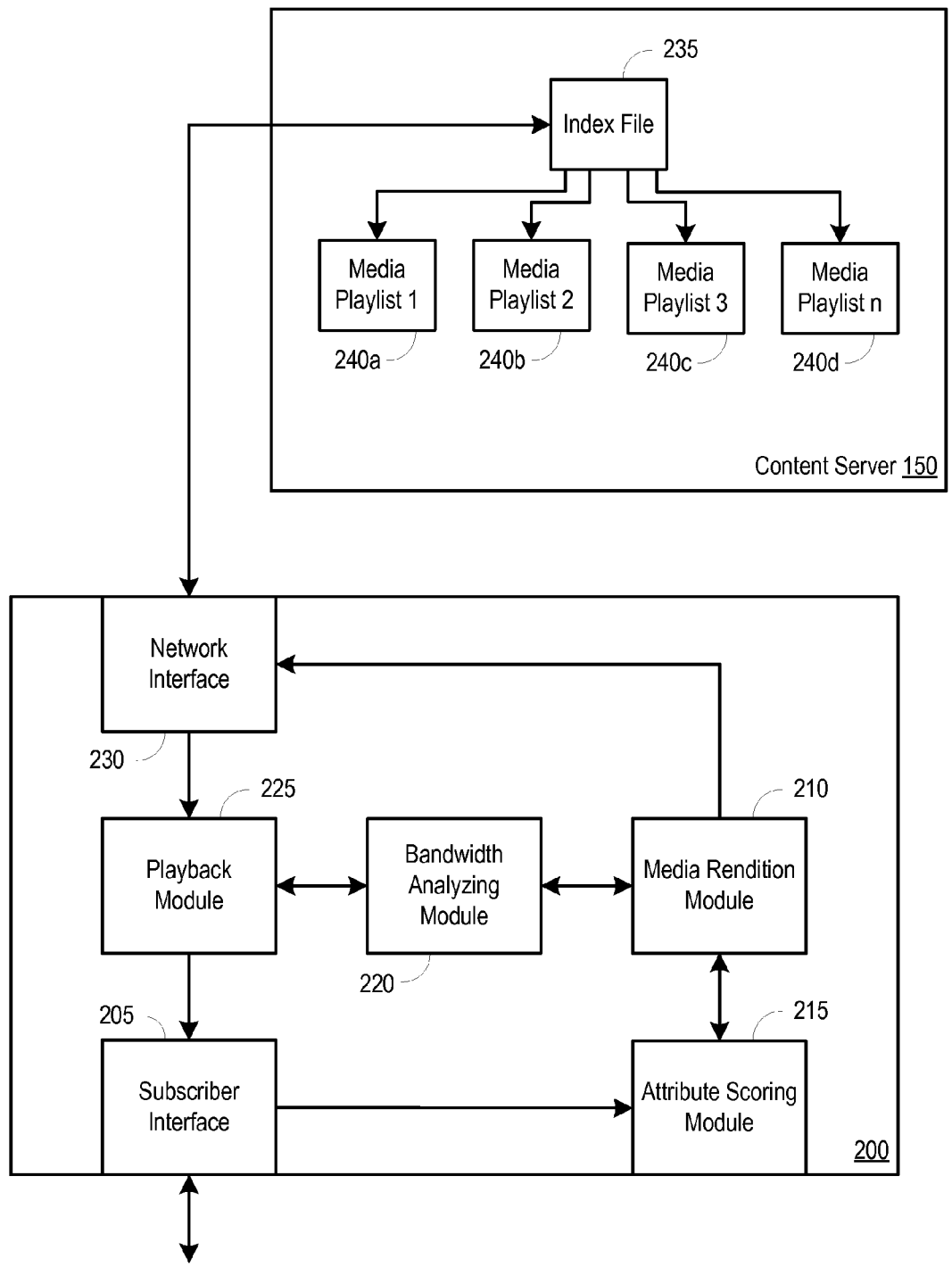
FIG. 2 is a block diagram illustrating an example component operable to facilitate the identification and delivery of one or more media renditions of content to a subscriber device.

FIG. 2 is a block diagram illustrating an example component 200 operable to facilitate the identification and delivery of one or more media renditions of content to a subscriber device. The component 200 may include a subscriber interface 205, a media rendition module 210, a bandwidth analyzing module 215, a playback module 220, an attribute scoring module 225, and a network interface 230. In embodiments, the component 200 may be integrated with a CPE device (e.g., set-top box (STB) 110a of FIG. 1, gateway 110b of FIG. 1, wireless router including an embedded modem 110c of FIG. 1, etc.) and/or a client device (e.g., television 140a of FIG. 1, computer 140b of FIG. 1, tablet 140c of FIG. 1, mobile device 140d of FIG. 1, etc.).

In embodiments, the component 200 can receive a request for content from a subscriber through the subscriber interface 205. The content request may include an identification of multimedia content as well as an identification of a specific media rendition of the multimedia content. For example, the subscriber content request may identify a specific language (e.g., English, Spanish, French, etc.) in which the subscriber desires to receive the audio and/or video component of the multimedia content. It should be understood that in some cases, the content request may not include an identification of a specific media rendition. The requested content may be content that is to be streamed to the requesting device using adaptive bit rate streaming.

In embodiments, a media rendition module 210 may identify one or more requested or preferred media renditions of multimedia content. For example, the media rendition module 210 may identify a requested media rendition from within the content request, and/or the media rendition module 210 can identify one or more preferred media renditions from the attribute scoring module 215.

In embodiments, the attribute scoring module 215 may maintain an ordered list of media renditions (e.g., languages or other media attributes) preferred by a subscriber or subscriber device (e.g., CPE device or client device). For example, each time a request for content in a specific language is received at the component 200, a score for the specific language can be incremented in the list stored at the attribute scoring module 215. The specific language requested may be identified from an adaptive bit rate content selection or may be based upon a specific language associated with live programming being viewed by a user. As another example, each time a piece of multimedia content is received at the component 200 and output to a subscriber through the subscriber interface 205, the specific language associated with the media rendition of the received content can be identified, and the score for the specific language can be incremented in the list stored at the attribute scoring module 215. It should be appreciated by those with skill in the relevant art that many different scoring algorithms may be used to maintain an ordered list of languages as preferred by a subscriber or subscriber device. In embodiments, an ordered list of languages may be maintained for each of a plurality of users having the ability to request content through the device associated with the component 200. For example, user login information (e.g., username and password) may be used to identify a user requesting content, and an ordered list of preferred languages corresponding to the user can be identified in the attribute scoring module 215.

In embodiments, the media rendition module 210 may determine a number of media renditions of the requested content to download based upon the amount of bandwidth available to the device associated with the component 200. The media rendition module 210 can identify a predetermined number of preferred languages (e.g., the two or three most highly scored languages for a user or device) from the attribute scoring module 215. The media rendition module 210 can then determine the amount of available bandwidth from the bandwidth analyzing module 220.

In embodiments, the bandwidth analyzing module 220 can monitor the bandwidth being used by a device associated with the component 200 (e.g., by monitoring the playback module 225, monitoring bandwidth use at other components of the device associated with the component 200, etc.) and can determine the difference between the bandwidth being used and the bandwidth available to the device. For example, the amount of bandwidth available to the device may be determined by measuring the data size of a segment that may be received at the device (e.g., size of transmission control protocol (TCP) receive window) and dividing the data size by the amount of time taken to receive the segment (e.g., round-trip delay time or round-trip time). The amount of bandwidth being used at a device may be determined by measuring the size of a segment received at the device and dividing the data size by the amount of time taken to receive the segment. It will be appreciated by those skilled in the relevant art that other systems and methods may be used to measure bandwidth use and bandwidth available at a device.

The media rendition module 210 may determine whether enough bandwidth is available to download each of the identified media renditions associated with the requested content. If the determination is made that there is not enough bandwidth to download all of the identified media renditions, the media rendition module 210 may identify only the top number of media renditions for which the device associated with the component 200 has sufficient bandwidth to download. The media rendition module 210 may identify the selected media renditions within the associated multimedia content request (e.g., specific media rendition files may be identified through an EXT_X_MEDIA metadata tag), and the multimedia content request may be output upstream through the network interface 230.

In embodiments, the multimedia content request can be delivered from the component 200 to the content server 150, and an index file 235 associated with the requested content may be identified. The index file 235 may include locations (e.g., uniform resource identifiers (URI)) of a plurality of different media renditions of the requested multimedia content. For example, the index file 235 may include multiple URIs identifying playlists (e.g., media playlists 240a-d comprising audio and/or video content) comprising different audio or video renditions of the requested content. A specific language associated with each of the playlists may be identified from a unique language value in a metadata tag of the playlist (e.g., EXT_X_MEDIA). One or more playlists 240a-d comprising audio or video in the one or more selected languages for download by the component 200 may be identified and downloaded to the component 200. Segmented media files within each of the selected playlists 240a-d may be downloaded to the component 200 in parallel.

In embodiments, the component 200 may receive media files from one or more playlists 240a-d through the network interface 230. In embodiments, the playback module 225 may select one of the playlists 240a-d from which to output audio or video to a subscriber. For example, the playback module 225 may identify and output audio or video of a requested or preferred language. The playback module 225 may determine the requested or preferred language from the media rendition module 210 and/or attribute scoring module 215. For example, the playback module 225 can automatically identify and output media of the language that is most highly scored in the attribute scoring module 215. In embodiments, a subscriber, through the subscriber interface 205, may request that media associated with the multimedia content be output in a different language. If the language selected by the subscriber is a language for which audio or video is being downloaded in parallel with the audio or video that is being output, the playback module 225 can begin outputting audio or video downloaded from the playlist 240a-d corresponding with the language requested by the subscriber. Parallel download of different media renditions facilitates quick and efficient switching between the media renditions.

In embodiments, the media rendition module 210 may alter the number of media renditions that is being downloaded by the component 200. When, the amount of available bandwidth for the component 200 is decreased, the media rendition module 210 can reduce the number of playlists 240a-d from which content is downloaded according to the remaining available bandwidth. The media rendition module 210 may also alter the number of downloaded media renditions according to subscriber behavior. For example, if a subscriber is selecting content in one, two, or only a few different languages, the media rendition module 210 can reduce the number of playlists 240a-d from which content is downloaded according to the languages being selected by the subscriber. The languages being selected by the subscriber may be determined based upon the attribute scoring at the attribute scoring module 215.

Figure 3:
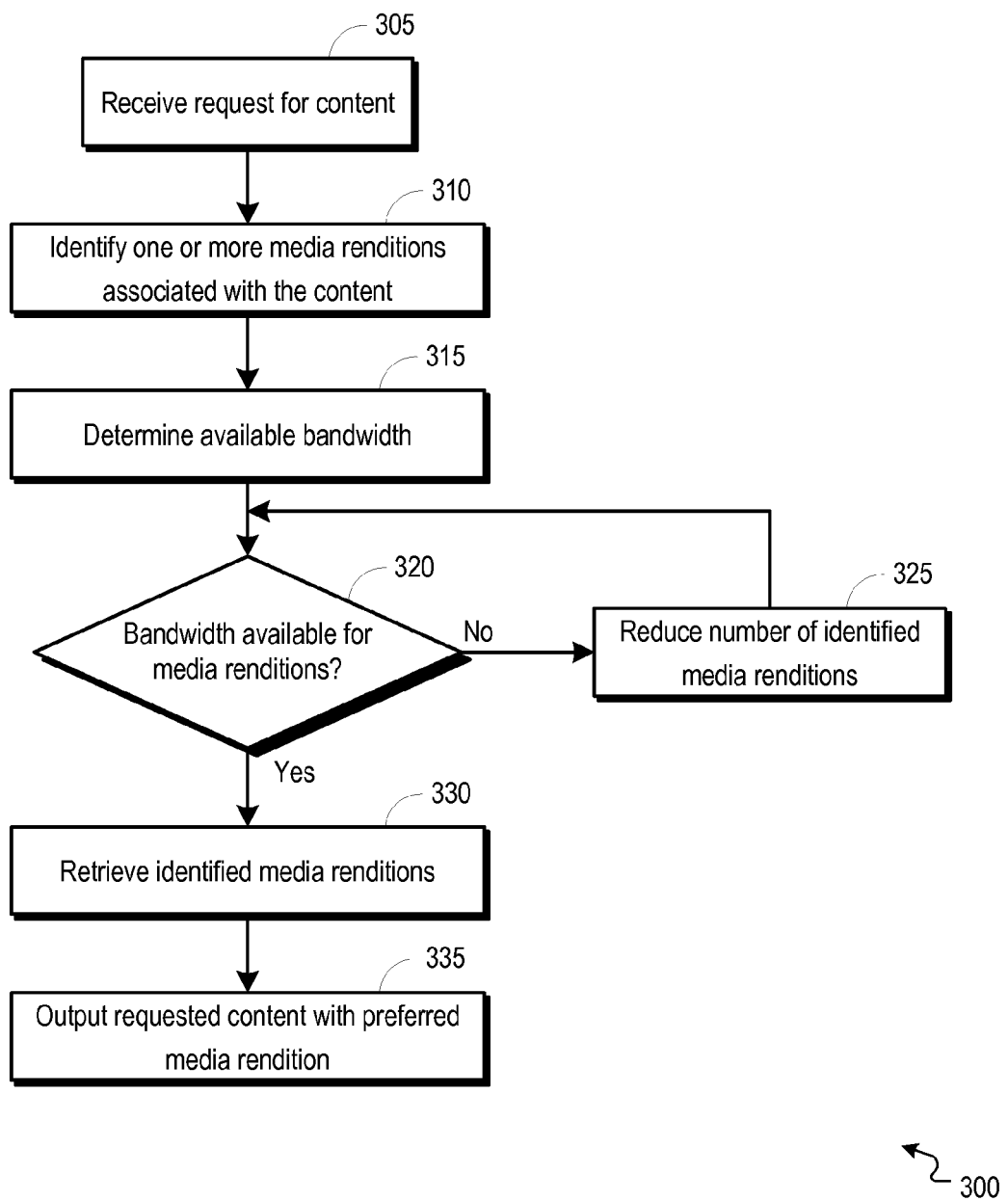
FIG. 3 is a flowchart illustrating an example process operable to facilitate the identification and delivery of one or more media renditions of content to a subscriber device.

FIG. 3 is a flowchart illustrating an example process 300 operable to facilitate the identification and delivery of one or more media renditions of content to a subscriber device. The process 300 can begin at 305, when a request for content is received at a subscriber device (e.g., CPE device 110a-c of FIG. 1 or client device 140a-d of FIG. 1). For example, a device can receive a subscriber request for content, such as content to be streamed using adaptive bit rate streaming. The content request may include an identification of a language in which the content is to be downloaded and output.

At 310, one or more media renditions (e.g., audio or video renditions) associated with the content may be identified. In embodiments, the media renditions may be audio and/or video of different languages in which the requested content can be received. One or more media renditions may be identified, for example by the media rendition module 210 of FIG. 2. The media rendition module 210 may identify a requested media rendition from within the content request, and/or the media rendition module 210 can identify one or more preferred media renditions from the attribute scoring module 215 of FIG. 2. The number of identified media renditions may be a predetermined number based upon a setting at the subscriber device (e.g., top 2 or 3 renditions), or the number may be based upon the amount of bandwidth available to the subscriber device. The number of identified media renditions may be based upon observed subscriber behavior. For example, the media rendition module 210 can identify only the number of media renditions that a subscriber typically requests and/or receives.

In embodiments, the attribute scoring module 215 may maintain an ordered list of media renditions (e.g., languages or other media attributes) preferred by a subscriber or subscriber device (e.g., CPE device or client device). As an example, the attribute scoring module 215 can maintain a score, or count, for each language that is requested and/or received at the subscriber device. Each time content in a specific language is requested at a subscriber device or received at the subscriber device, the score for the specific language can be incremented at the attribute scoring module 215. It should be appreciated by those with skill in the relevant art that many different scoring algorithms may be used to maintain an ordered list of languages as preferred by a subscriber or subscriber device. Languages may be ordered in the attribute scoring module 215 from most requested/received language to the least requested/received language.

At 315, the amount of bandwidth available to the subscriber device may be determined. The bandwidth available to the device may be determined, for example, by a bandwidth analyzing module 220 of FIG. 2. In embodiments, the bandwidth analyzing module 220 can monitor the bandwidth being used by the subscriber device by monitoring playback of content at the device and/or by monitoring bandwidth used at other components of the device, and the bandwidth analyzing module 220 can determine the difference between the bandwidth being used and the bandwidth available to the device. For example, the amount of bandwidth available to the device may be determined by measuring the data size of a segment that may be received at the device (e.g., size of transmission control protocol (TCP) receive window) and dividing the data size by the amount of time taken to receive the segment (e.g., round-trip delay time or round-trip time). The amount of bandwidth being used at a device may be determined by measuring the size of a segment received at the device and dividing the data size by the amount of time taken to receive the segment. It will be appreciated by those skilled in the relevant art that other systems and methods may be used to measure bandwidth use and bandwidth available at a device.

At 320, the determination can be made whether the subscriber device has enough available bandwidth to receive each of the identified media renditions. The determination whether enough bandwidth is available to receive each of the media renditions may be made, for example, by the media rendition module 210 of FIG. 2. In embodiments, the media rendition module 210 can determine the amount of bandwidth needed to receive each of the identified media renditions and can compare the amount of bandwidth needed to the amount of bandwidth available to the subscriber device (e.g., as determined by the bandwidth analyzing module 220 of FIG. 2). If the amount of bandwidth needed to receive each of the identified media renditions is greater than the amount of bandwidth available to the subscriber device, the process 300 can proceed to 325.

At 325, the number of identified media renditions can be reduced. In embodiments, the media rendition module 210 of FIG. 2 may remove from the group of identified media renditions, the media rendition(s), such as language(s), having the lowest score(s) (e.g., as scored within the attribute scoring module 215 of FIG. 2). After the number of identified media renditions is reduced, the process 300 can return to 320.

Returning to 320, if the determination is made that the amount of bandwidth needed to receive each of the identified media renditions is less than the amount of bandwidth available to the subscriber device, the process 300 can proceed to 330. At 330, the identified media renditions associated with the requested content can be retrieved. In embodiments, the subscriber device can output a request for the one or more identified media renditions to a content server (e.g., content server 150 of FIG. 1). The request can identify an index file (e.g., index file 235 of FIG. 2) associated with the requested content, and one or more playlists (e.g., playlists 240a-d of FIG. 2) including media in the one or more identified renditions, or languages, can be identified from within the index file. For example, specific languages associated with the playlists can be identified from metadata tags of the playlists (e.g., value(s) within an EXT_X_MEDIA tag). In embodiments, the identified playlist(s) can be downloaded to the subscriber device. For example, segmented media files within each of the identified playlists 240a-d of FIG. 2 may be downloaded to the subscriber device in parallel.

At 335, the subscriber device may output the requested content including the media rendition of the content that is requested or preferred by the requesting subscriber. In embodiments, the subscriber device may receive multiple media files from one or more playlists 240a-d and the subscriber device may select one of the playlists 240a-d from which to output media to a subscriber. For example, the playback module 225 of FIG. 2 may identify and output audio or video of a requested or preferred language. The playback module 225 may determine the requested or preferred language from the media rendition module 210 of FIG. 2 and/or attribute scoring module 215 of FIG. 2. For example, the playback module 225 can automatically identify and output audio or video of the language that is most highly scored in the attribute scoring module 215. In embodiments, a subscriber may request that media associated with the multimedia content be output in a different language. If the language selected by the subscriber is a language for which audio or video is being downloaded in parallel with the audio or video that is being output, the playback module 225 can begin outputting audio or video downloaded from the playlist 240a-d corresponding with the language requested by the subscriber.

Figure 4:
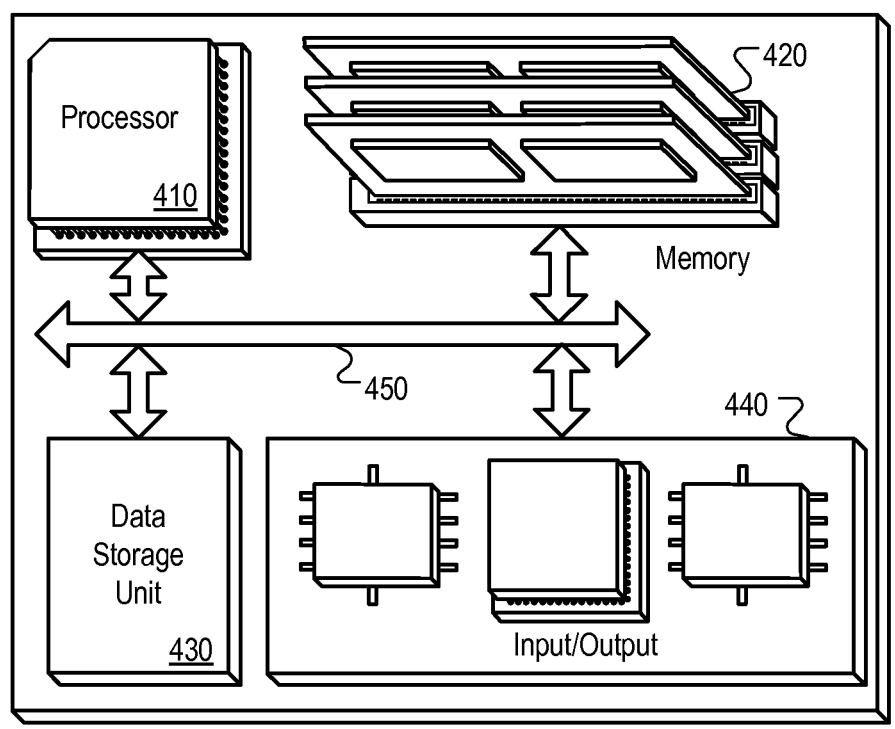
FIG. 4 is a block diagram of a hardware configuration operable to facilitate the identification and delivery of one or more media renditions of content to a subscriber device.

FIG. 4 is a block diagram of a hardware configuration 400 operable to facilitate the identification and delivery of one or more media renditions of content to a subscriber device. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 140a-d of FIG. 1 (e.g, television, computer, tablet, mobile device, etc.) and/or a CPE device 110a-c of FIG. 1 (e.g., STB, gateway, modem, etc.). In embodiments, the input/output device can include driver devices configured to send communications to, and receive communications from one or more networks (e.g., access network 130 of FIG. 1, WAN 120 of FIG. 1, etc.).

Those skilled in the art will appreciate that the invention improves upon methods and systems for delivering multiple media renditions of multimedia content to a subscriber. The methods, systems, and apparatuses described in this disclosure enable the identification and retrieval of one or more preferred or requested media renditions of multimedia content. A subscriber device can maintain a list of media attributes preferred by the subscriber device and/or one or more users with access to the subscriber device, wherein the list includes preferred media attributes in order from the most requested/received attribute to the least requested/received attribute. When the subscriber device receives a request for multimedia content, the subscriber device can identify one or more media attributes preferred by the subscriber, and media renditions of the multimedia content in each of the identified attributes can be downloaded to the subscriber device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a request for multimedia content at a device;
   determining a first group of one or more alternate renditions of media associated with the requested multimedia content, wherein each alternate rendition of media comprises a media attribute;
   identifying one or more preferred media attributes associated with the device, wherein the one or more preferred media attributes are identified from a hierarchical list comprising a plurality of media attributes, wherein each of the plurality of media attributes is given a score based on the number of times the media attribute is used within multimedia content that is output from the device, and wherein the hierarchical list is maintained by identifying a media attribute associated with the received multimedia content and incrementing the score of the identified media attribute within the hierarchical list;
   determining a second group of one or more alternate renditions of media from the first group of one or more alternate renditions of media, wherein each alternate rendition of media of the second group of one or more alternate renditions of media include preferred media attributes associated with the device;
   retrieving one or more of the alternate renditions of media that are included in the second group of one or more alternate renditions of media; and
   outputting the requested multimedia content along with at least one of the retrieved alternate renditions of media.

2. The method of claim 1, wherein the one or more preferred media attributes associated with the device are identified from a hierarchical list comprising a plurality of media attributes, the media attributes being ordered within the hierarchical list based upon the number of times each media attribute is used within multimedia content that is output from the device.

3. The method of claim 2, wherein the second group of one or more alternate renditions of media that include preferred media attributes associated with the device comprise the one or more alternate renditions of media that include the one or more media attributes that are listed highest, relative to each other, in the hierarchical list.

4. The method of claim 1, further comprising:
   determining an amount of bandwidth needed to retrieve the second group of one or more alternate renditions of media that include preferred media attributes;
   determining an amount of bandwidth available to the device; and
   if the amount of bandwidth needed to retrieve the second group of one or more alternate renditions of media that include preferred media attributes is greater than the amount of bandwidth available to the device, reducing the number of alternate renditions of media to retrieve according to the amount of bandwidth available to the device.

5. The method of claim 1, wherein the requested multimedia content is retrieved by the device using adaptive bit rate streaming.

6. The method of claim 1, wherein the second group of one or more alternate renditions of media that include preferred media attributes are retrieved by downloading the alternate renditions of media in parallel from a content server.

7. The method of claim 1, wherein the media attribute associated with each alternate rendition of media comprises a different language.

8. The method of claim 1, wherein determining the first group of one or more alternate renditions of media associated with the requested multimedia content comprises identifying alternate renditions of media within a manifest file including the requested multimedia content.

9. An apparatus comprising:
   an interface that receives a request for multimedia content;
   one or more modules that:
      determine a first group of one or more alternate renditions of media associated with the requested multimedia content, wherein each alternate rendition of media comprises a media attribute;
      identify one or more preferred media attributes, wherein the one or more preferred media attributes are identified from a hierarchical list comprising a plurality of media attributes, wherein each of the plurality of media attributes is given a score based on the number of times the media attribute is used within multimedia content that is output from the apparatus, and wherein the hierarchical list is maintained by identifying a media attribute associated with the received multimedia content and incrementing the score of the identified media attribute within the hierarchical list;
      determine a second group of one or more alternate renditions of media from the first group of one or more alternate renditions of media, wherein each alternate rendition of media of the second group of one or more alternate renditions of media includes preferred media attributes;
   an interface that retrieves one or more of the alternate renditions of media that are included in the second group of one or more alternate renditions of media; and
   an interface that outputs the requested multimedia content along with at least one of the retrieved alternate renditions of media that include preferred media attributes.

10. The apparatus of claim 9, wherein the one or more preferred media attributes are identified from a hierarchical list comprising a plurality of media attributes, the media attributes being ordered within the hierarchical list based upon the number of times each media attribute is used within multimedia content that is output from the interface configured to be used to output multimedia content.

11. The apparatus of claim 10, wherein the second group of one or more alternate renditions of media that include preferred media attributes comprise the one or more alternate renditions of media that include the one or more media attributes that are listed highest, relative to each other, in the hierarchical list.

12. The apparatus of claim 9, wherein the one or more modules:
   determine an amount of bandwidth needed to retrieve the second group of one or more alternate renditions of media that include preferred media attributes;
   determine an amount of bandwidth available for use in the retrieval of the second group of one or more alternate renditions of media that include preferred media attributes; and
   if the amount of bandwidth needed to retrieve the second group of one or more alternate renditions of media that include preferred media attributes is greater than the amount of available bandwidth, reduce the number of alternate renditions of media to retrieve according to the amount of available bandwidth.

13. One or more non-transitory computer readable media having instructions operable to cause one or more processors to perform the operations comprising:
   receiving a request for multimedia content at a device;
   determining a first group of one or more alternate renditions of media associated with the requested multimedia content, wherein each alternate rendition of media comprises a media attribute;
   identifying one or more preferred media attributes associated with the device, wherein the one or more preferred media attributes are identified from a hierarchical list comprising a plurality of media attributes, wherein each of the plurality of media attributes is given a score based on the number of times the media attribute is used within multimedia content that is output from the device, and wherein the hierarchical list is maintained by identifying a media attribute associated with the received multimedia content and incrementing the score of the identified media attribute within the hierarchical list;
   determining a second group of one or more alternate renditions of media from the first group of one or more alternate renditions of media, wherein each alternate rendition of media of the second group of one or more alternate renditions of media include preferred media attributes associated with the device;
   retrieving one or more of the alternate renditions of media that are included in the second group of one or more alternate renditions of media; and
   outputting the requested multimedia content along with at least one of the retrieved alternate renditions of media.

14. The one or more non-transitory computer-readable media of claim 13, wherein the one or more preferred media attributes associated with the device are identified from a hierarchical list comprising a plurality of media attributes, the media attributes being ordered within the hierarchical list based upon the number of times each media attribute is used within multimedia content that is output from the device.

15. The one or more non-transitory computer-readable media of claim 14, wherein the second group of one or more alternate renditions of media that include preferred media attributes associated with the device comprise the one or more alternate renditions of media that include the one or more media attributes that are listed highest, relative to each other, in the hierarchical list.

16. The one or more non-transitory computer-readable media of claim 13, wherein the instructions are further operable to cause one or more processors to perform the operations comprising:
   determining an amount of bandwidth needed to retrieve the second group of one or more alternate renditions of media that include preferred media attributes;
   determining an amount of bandwidth available to the device; and
   if the amount of bandwidth needed to retrieve the second group of one or more alternate renditions of media that include preferred media attributes is greater than the amount of bandwidth available to the device, reducing the number of alternate renditions of media to retrieve according to the amount of bandwidth available to the device.

17. The one or more non-transitory computer-readable media of claim 13, wherein the media attribute associated with each alternate rendition of media comprises a different language.

* * * * *